(12) United States Patent
Adami et al.

(10) Patent No.: US 12,728,615 B2
(45) Date of Patent: Sep. 8, 2026

(54) PLANT AND METHOD FOR MANUFACTURING CORRUGATED BOARD WITH AN ORDER CHANGE DETECTOR

(71) Applicant: FOSBER S.P.A., Pescaglia (IT)

(72) Inventors: Mauro Adami, Viareggio (IT); Lorenzo Vannucchi, Pescaglia (IT)

(73) Assignee: Fosber S.p.A., Pescaglia (IT)

( * ) Notice: Subject to any disclaimer, the term of this patent is extended or adjusted under 35 U.S.C. 154(b) by 0 days.

(21) Appl. No.: 18/727,405

(22) PCT Filed: Jan. 9, 2023

(86) PCT No.: PCT/IB2023/050156
§ 371 (c)(1),
(2) Date: Jul. 9, 2024

(87) PCT Pub. No.: WO2023/131917
PCT Pub. Date: Jul. 13, 2023

(65) Prior Publication Data

US 2025/0121579 A1 Apr. 17, 2025

(30) Foreign Application Priority Data

Jan. 10, 2022 (IT) ........................ 102022000000215

(51) Int. Cl.
*B31F 1/28* (2006.01)
*B65H 35/04* (2006.01)
(Continued)

(52) U.S. Cl.
CPC .......... *B31F 1/2831* (2013.01); *B31F 1/2804* (2013.01); *B31F 1/2822* (2013.01);
(Continued)

(58) Field of Classification Search
CPC .... B31F 1/2831; B31F 1/2804; B31F 1/2822; B31F 1/28; B65H 35/04; B65H 43/08;
(Continued)

(56) References Cited

U.S. PATENT DOCUMENTS 4,576,663 A * 3/1986 Bory ..................... B31F 1/2831 700/122
5,325,306 A * 6/1994 Adachi ................ B31F 1/2831 156/367

(Continued)

FOREIGN PATENT DOCUMENTS

DE 102010008906 A1 11/2010
EP 0737553 A1 10/1996

(Continued)

*Primary Examiner* — Veronica Martin
*Assistant Examiner* — Mobeen Ahmed
(74) *Attorney, Agent, or Firm* — Breiner & Breiner, L.L.C.

(57) ABSTRACT

The plant includes a visual inspection system provided with one or more vision units. The vision units detect and recognize, through adequate electronic processing, the images printed on at least one face of the corrugated board web. Based on the image recognition, the control system recovers, from a lookup table, information for setting the converting line to produce the subsequent order of sheets.

13 Claims, 4 Drawing Sheets

(51) Int. Cl.
*B65H 43/08* (2006.01)
*G06T 7/00* (2017.01)

(52) U.S. Cl.
CPC ............. *B65H 35/04* (2013.01); *B65H 43/08* (2013.01); *G06T 7/0004* (2013.01); *B65H 2301/21* (2013.01); *G06T 2207/30144* (2013.01)

(58) Field of Classification Search
CPC ........ B65H 2301/21; B65H 2701/1762; B65H 29/66; B65H 31/10; B65H 31/24; G06T 7/0004; G06T 2207/30144; B31B 50/16; B31B 50/18; B31B 50/25
See application file for complete search history.

(56) References Cited

U.S. PATENT DOCUMENTS

| | | | | |
|---|---|---|---|---|
| 5,437,749 | A | 8/1995 | Pipkorn et al. | |
| 5,829,951 | A | 11/1998 | Adami | |
| 5,951,454 | A | 9/1999 | Adami | |
| 6,071,222 | A * | 6/2000 | Schneider | B26D 1/245 493/402 |
| 6,092,452 | A | 7/2000 | Adami | |
| 6,103,171 | A * | 8/2000 | Cummings | B26D 9/00 264/269 |
| 6,117,381 | A * | 9/2000 | Cummings | B26D 11/00 264/269 |
| 6,165,117 | A | 12/2000 | Adami | |
| 6,684,749 | B2 * | 2/2004 | Adami | B26D 11/00 83/408 |
| 6,722,243 | B2 | 4/2004 | Adami | |
| 6,893,520 | B2 * | 5/2005 | Cummings | B26D 5/32 156/271 |
| 6,966,961 | B2 | 11/2005 | Adami | |
| 7,291,243 | B2 | 11/2007 | Adami | |
| 7,441,579 | B2 | 10/2008 | Adami | |
| 8,266,995 | B2 * | 9/2012 | Takashimizu | B65H 35/04 83/508.1 |
| 8,342,068 | B2 | 1/2013 | Adami | |
| 8,714,223 | B2 | 5/2014 | Adami et al. | |
| 10,272,633 | B2 | 4/2019 | Bayer et al. | |
| 10,882,271 | B2 | 1/2021 | Lang et al. | |
| 2001/0047704 | A1 * | 12/2001 | Adami | B23D 35/008 83/13 |
| 2004/0182503 | A1 * | 9/2004 | Stadele | B31F 1/2822 156/472 |
| 2012/0081726 | A1 * | 4/2012 | Nakamaru | G06K 15/022 358/1.14 |
| 2012/0193026 | A1 | 8/2012 | Adami | |
| 2013/0029825 | A1 * | 1/2013 | Rich | B41J 3/543 493/395 |
| 2014/0274643 | A1 * | 9/2014 | Clark | B26D 7/20 493/354 |
| 2014/0306395 | A1 * | 10/2014 | Suzuki | B65H 35/04 270/52.02 |
| 2015/0178028 | A1 * | 6/2015 | Elchlepp | B41F 33/12 358/1.18 |
| 2017/0087794 | A1 * | 3/2017 | Bayer | B26D 5/34 |
| 2017/0266965 | A1 * | 9/2017 | Gohda | B41J 11/008 |
| 2018/0200906 | A1 * | 7/2018 | Senoo | B26D 5/007 |
| 2018/0345619 | A1 * | 12/2018 | Lang | B31F 1/289 |
| 2019/0016081 | A1 * | 1/2019 | Widner | B31F 1/2822 |
| 2019/0018629 | A1 * | 1/2019 | Seay | G06F 3/1204 |
| 2019/0084266 | A1 | 3/2019 | Grunwald et al. | |
| 2021/0086467 | A1 * | 3/2021 | Lang | B65H 35/02 |

FOREIGN PATENT DOCUMENTS

| | | | |
|---|---|---|---|
| EP | 1362691 | A2 | 11/2003 |
| EP | 3231751 | A1 | 10/2017 |
| EP | 3156199 | B1 | 7/2018 |
| EP | 3678859 | B1 | 8/2021 |
| GB | 2542569 | A | 3/2017 |
| WO | 2017036685 | A1 | 3/2017 |
| WO | 2017051146 | A1 | 3/2017 |
| WO | 2021005123 | A1 | 1/2021 |

* cited by examiner

NS
S
N1
N2
N3
N4
N5
B1
B1X
B2
B2X
1
3
5
7
8
21
23
25
27
29
30
31
32
33
36
37
39
41
43
45
47
49
51
53
121
121A
123
125

PLANT AND METHOD FOR MANUFACTURING CORRUGATED BOARD WITH AN ORDER CHANGE DETECTOR

TECHNICAL FIELD

The present invention relates to plants for manufacturing corrugated board. More particularly, embodiments described herein refer to plants for manufacturing corrugated board, provided with systems for processing subsequent orders of sheets produced from a same corrugated board web.

BACKGROUND TO THE INVENTION

For manufacturing corrugated board, plants are used comprising one or more single facers, to each of which a pair of webs of flat paper is fed. A first web is corrugated in the single facer between a first corrugating roll and a second corrugating roll. The first web of fluted paper is glued to the second web of flat paper by means of a pressure device, for example a belt or a pressure roll. In this way a web of so-called single face corrugated board is obtained, constituted by a fluted paper web and a flat paper web or liner. The single face corrugated board is fed, together with a third web of flat paper, to a double facer where the single face corrugated board is glued to the third web of flat paper, this latter forming a second liner.

In some plants, several single facers are provided, each of which produces a web of single face corrugated board. Several webs of single face corrugated board are simultaneously fed to the double facer, together with the third web of flat paper, to form a corrugated board. The corrugated board is therefore constituted, in this case, by two outer liners and a plurality of fluted paper webs interposed between the liners. Adjacent webs of fluted paper are separated from one another by an intermediate web of flat paper or liner.

The corrugated board web from the double facer is then trimmed, thus eliminating the longitudinal trimmings, and divided into longitudinal strips, each of which can adequately be scored. Then, the strips are transversely cut to form corrugated sheets with scoring lines that can be used for producing corrugated boxes or other similar articles.

A plant of this type is disclosed for example in U.S. Pat. No. 5,437,749.

Nowadays, there is a growing trend towards increasingly smaller orders of corrugated sheets, i.e. orders comprised each of a limited number of sheets. Often, the same corrugated board web is used to process consecutive orders of sheets, changing the position of the longitudinal and transverse cuts and of the scoring lines. This requires efficiently detecting the passage from an order to the subsequent one, so as to set, in prompt and right manner, the cutting and scoring members that, in general, are part of a system for converting the corrugated board web into single corrugated sheets.

U.S. Pat. No. 10,882,271 discloses an automatic system for processing sheets. The system disclosed in this prior art document requires printing markers on the corrugated board web, the markers containing information necessary for setting the cutting and scoring members. A visual inspection system reads the markers and interprets the information contained in them, in order to check the right setting of the production line. This prior art system is efficient but also very complex and requires printing smart marks on the continuous corrugated board web, i.e. marks containing specific information necessary for setting the production line.

Nowadays, there is an increasing use of printed sheets of corrugated board. Usually, each production batch or order is characterized by an image printed on each individual sheet. The image can be a decorative image, and/or can contain marks or logos indicating the user of the box formed with the sheet. Instead of, or in addition to, what above, the image can comprise written information, indicating for example the content of the box or the origin thereof, or any other information.

In some cases (U.S. Pat. No. 10,882,271, US 2019/0084266) the production line contains a digital printer creating the images along the path of one of the web forming the corrugated board web. The use of an in-line digital printer allows to economically produce even very small batches.

In U.S. Pat. No. 10,882,271 (WO 2017/051146) and GB 2542569, a system is disclosed for manufacturing corrugated board, wherein the corrugated board web is provided with one marker for each area intended to form, after cutting, a single board sheet. The marker contains the information that allows identifying the order to which the sheet belongs, and also indicates the sequential number of the sheet within the order. The marker can be, for example, a code automatically readable by a machine, for example a QR code or a bar code. The code is generally of the type xxx-yyyyy, wherein xxx indicates the number of the production order and yyyyy indicates the sequential number of the sheet within the order xxx. A database is stored in a memory of the control unit, the database constituting a map of the corrugated board web. This map allows controlling the production line by reading the individual codes printed on the corrugated board web and associating the read codes to the information stored in the map. The codes are printed on corrugated board portions intended to be removed as trimmings, or on portions not visible in the finished product, for instance in the box realized with the sheets manufactured by the corrugated board production line.

The codes can be only processed in a dedicated production line, and are used in combination with a lookup table, which contains a specific piece of information for each sheet that shall be produced from a paper roll. A paper sheet provided with printed codes (markers) for identifying the individual sheets can be used only in a plant configured to use this specific processing system, and the system can only process paper rolls provided with these specific identification codes. In this regard, the prior art system is very accurate, as it allows to know, at every instant, which specific sheet is being processed; however, it is also very rigid.

EP 3156199 (U.S. Pat. No. 10,272,633) discloses a plant for producing corrugated board, wherein a sensor detects when a roll is finishing by reading a mark indicating the end of the roll, allowing to control the roll replacement cycle. A further sensor can be also provided, adapted to detect the change in the image printed on the corrugated board web, in order automatically to start the cut-off knife forming, in the corrugated board, the transverse cut in the transition area between an order and the subsequent one.

The prior art systems and methods for processing small batches or orders are complex and expensive. There is therefore a need for simpler systems, especially for processing small batches or orders, obtained by converting a same corrugated board web.

SUMMARY OF THE INVENTION

According to an aspect, disclosed herein is a plant for manufacturing corrugated board sheets with a liner on either face, the plant being provided with systems adapted to automate and simplify the transition from the production of a previous order to the production of a subsequent order by using the images printed on at least one face of the corrugated board web from which the individual sheets are produced.

In general, the plant comprises at least a single facer for producing a single face corrugated board web comprising a first web of flat paper and a web of fluted paper glued to each other. Downstream of the single facer, the plant comprises a converting system for converting the corrugated board web into individual sheets, each sheet containing at least one printed image that constitutes the image of the finished product (board sheet) to be used for producing the cardboard box or other article, on which the image shall be visible.

The corrugated board web contains sheets of a plurality of consecutive orders. In other words, the corrugated board web is adapted to be cut into sheets belonging to different production orders or batches, which particularly differ in the printed image that characterizes the sheets of an order, that is different than the printed image characterizing the sheets of a different order. In practice, two consecutive orders differ from each other in the image printed on at least one of the two faces of the sheets.

The plant also comprises a visual inspection system adapted to read the images printed on the various sheets, i.e. on the various portions of corrugated board web that, constitute the individual sheets of the various production orders, after transverse and longitudinal cutting.

The visual inspection system comprises at least one visual inspection unit, for instance a video camera, provided upstream of the converting system with respect to the feed direction of the corrugated board web. The visual inspection unit is adapted to read the images printed on the corrugated board web, i.e. to acquire the images to allow the processing thereof, when the corrugated board web is fed along the plant for the production of corrugated board sheets and passes in front of the visual inspection unit.

As it will be clearly apparent from the following description of some embodiments, the visual inspection system can comprise a plurality of visual inspection units. Two or more visual inspection units can be provided, arranged in different positions along the longitudinal feed path of the corrugated board. The different visual inspection units give information to be used for different functions.

In this document, the terms “image” and “printed image” refer to a decorative and/or informative printed image intended to give a piece of information and readable by a user or an operator, for instance on the outside of a package produced with the sheet of corrugated board. A decorative image can comprise (or be constituted by) an informative image; an image can even be a combination of a decorative image and an informative image, adapted in general to remain clearly visible on at least one face of the corrugated board sheet even after the sheet has been folded to form a box, for instance.

Typically, an image as intended herein may comprise, individually or in combination, one or more of the following elements: a trademark; a logo; a decorative pattern; a piece of information, for instance on the content of the box made with the corrugated board sheet, suitably folded. In general, the image is an element characterizing the sheet or the item produced with the sheet (for instance a box) when used after having been produced. The term “image” as intended herein does not comprise any printed elements intended only to control the feed of the web material along the plant, for example transverse or longitudinal reference markers simply used for checking or phasing the cuts.

Therefore, differently from what disclosed, for example, in WO 2017/051146 or GB 2542569, it is not necessary to print, on either of the paper sheets forming the corrugated board, an id code or marker identifying the order to which the sheet belongs that will be produced with the respective portion of corrugated board web.

On the contrary, for managing the production plant or line, the present invention provides for directly using the decorative or informative images that characterize the finished sheets and constitute a visual element adapted to distinguish the pack or package produced with the sheet.

In this way, on one hand it is not necessary to print specific codes or markers on the paper sheets intended to form the sheet of corrugated board. On the other hand, the line management is smoother and it is possible to use rolls of any origin in a line provided with the hardware and software sufficient to manage, as described below, the decorative images printed on at least one of the paper sheets that will form the corrugated board sheets.

For instance, as described in greater detail below, the information obtained by processing the images acquired by a visual inspection unit can be used to detect the end point of an order, and therefore the area of transition towards the portion of corrugated board intended for the production of the sheets of the subsequent order. This information can be used to obtain, through recognition of the image detected downstream of the area of transition between an order and a subsequent one, the information necessary for setting the converting system before starting the production of the subsequent order. The setting of the converting system can comprise the positioning of the transverse and/or longitudinal cutting tools, as well as of the scoring tools, if any.

The information obtained from a different (or the same) visual inspection unit can be used to control and to adjust the lateral shifting of the corrugated board. The visual inspection system can be suitable, for example, to verify (through framing by a visual inspection unit) whether the corrugated board web shifts transversely, and, in case, to send controls to transversely move the longitudinal cutting and/or scoring members, or other members that shall keep a precise relative position, in transverse direction, with respect to the corrugated board web. The lateral shifting of the corrugated board web can be detected through a transverse displacement of the image printed on the sheet relative to the nominal or desired position thereof.

The same visual inspection unit, or a supplementary visual inspection unit, can be used to control the synchronization of the transverse cuts with the position of the images printed on the corrugated board web. This function can be carried out by a visual inspection unit, provided upstream of cut-off knives that transversely cut the corrugated board web to form the individual sheets. In this case, a signal may be generated, synchronizing in advance the cut position.

In this way, it is not necessary to print, on the corrugated board web, markers or codes having the sole purpose of controlling the production operations, as occurs today in the prior art plants.

In practice, in the disclosed system the same image characterizing each finished sheet, is also used to control the order change and the setting of the tools and, if necessary, to adjust any lateral or longitudinal shifting that could cause a wrong positioning of the image on the sheet obtained by longitudinally and transversely cutting the corrugated board web.

In some embodiments, the correct position in longitudinal and transverse direction of the images printed on the corrugated board web relative to the longitudinal and transverse cutting lines is checked upstream, then the images are tracked and the position of the cutting lines is adjusted, before a lateral or longitudinal shifting occurs.

In further embodiments, through a visual inspection unit provided downstream of the cut-off knife, it is possible to perform a quality control of the cut sheet for verifying the accurateness of the cut position with respect to the position of the image printed on the sheet. If an error is detected, a feedback signal can be generated for bringing the cut-off knife, and the cuts it performs, again in phase with the position of the printed images. A similar control with feedback signal can be carried out downstream to adjust any lateral shifting of the corrugated board web.

Each visual inspection unit can comprise a single camera or a plurality of cameras arranged in different positions in transverse direction, so as to frame the entire width of the corrugated board web, even when using cameras with a limited frame.

In some embodiments, the plant comprises longitudinal cutting tools and longitudinal scoring tools. The tools shall be positioned in the right way for each production order. Through the visual inspection system described herein, it is possible to detect the passage, in a position of the converting line upstream of the cutting and scoring tools, of the area of transition from a previous order to a subsequent order. The visual inspection unit, directly through on-board software or indirectly through software on board of a separate control unit, is adapted not only to detect the passage of a different image, an event indicating that the transition area, i.e. the order change area, is passing in front of the visual inspection unit. Through an image recognition software it is possible to recognize the subsequent order based on the recognition of the new image that is passing in front of the visual inspection unit.

Once the image has been detected, i.e. recognized, it is possible to recover, from a database in the form of a lookup table, the information necessary for setting the members of the section of the plant where the corrugated board web is converted, in order to promptly start the production of a new order.

The converting system can comprise one or more stackers for putting the sheets cut from the corrugated board web over one another. The information for setting the converting system, that can be recovered from the lookup table through recognition of the printed image characterizing the new production order, can also comprise information for controlling the stacker. The information can especially concern the transverse and longitudinal dimensions of the sheets of the new order, based on which the conveyors and the devices that shingle the sheets along the path towards the stacking platform are controlled.

According to a further aspect, a method is provided for manufacturing corrugated board sheets, comprising the following steps:

- producing a corrugated board web comprising at least a web of flat paper and a web of fluted paper; wherein the flat paper web has a printed image; wherein the corrugated board web contains sheets of subsequent orders, each subsequent order having an image different from the image of the previous order;
- feeding the corrugated board web along a feed path in front of a visual inspection unit adapted to read the images;
- feeding the corrugated board web through a converting system downstream of the visual inspection unit, and converting the corrugated board web into individual corrugated board sheets;
- when the visual inspection unit detects a change in the image of a subsequent order with respect to the image of a previous order, recovering, from a lookup table, information associated with the image printed on the corrugated board web and associated with the subsequent order, so as to set the converting system to produce the subsequent order before the corrugated board web, containing the image associated with the subsequent order, arrives in the converting system.

Further advantageous characteristics and embodiments of the plant and the method are described below and defined in the attached claims.

BRIEF DESCRIPTION OF THE DRAWING

The invention will be better understood by following the description below and the accompanying drawing, which shows non-limiting embodiments of the invention. More particularly, in the drawing.

DETAILED DESCRIPTION

Figure 1:
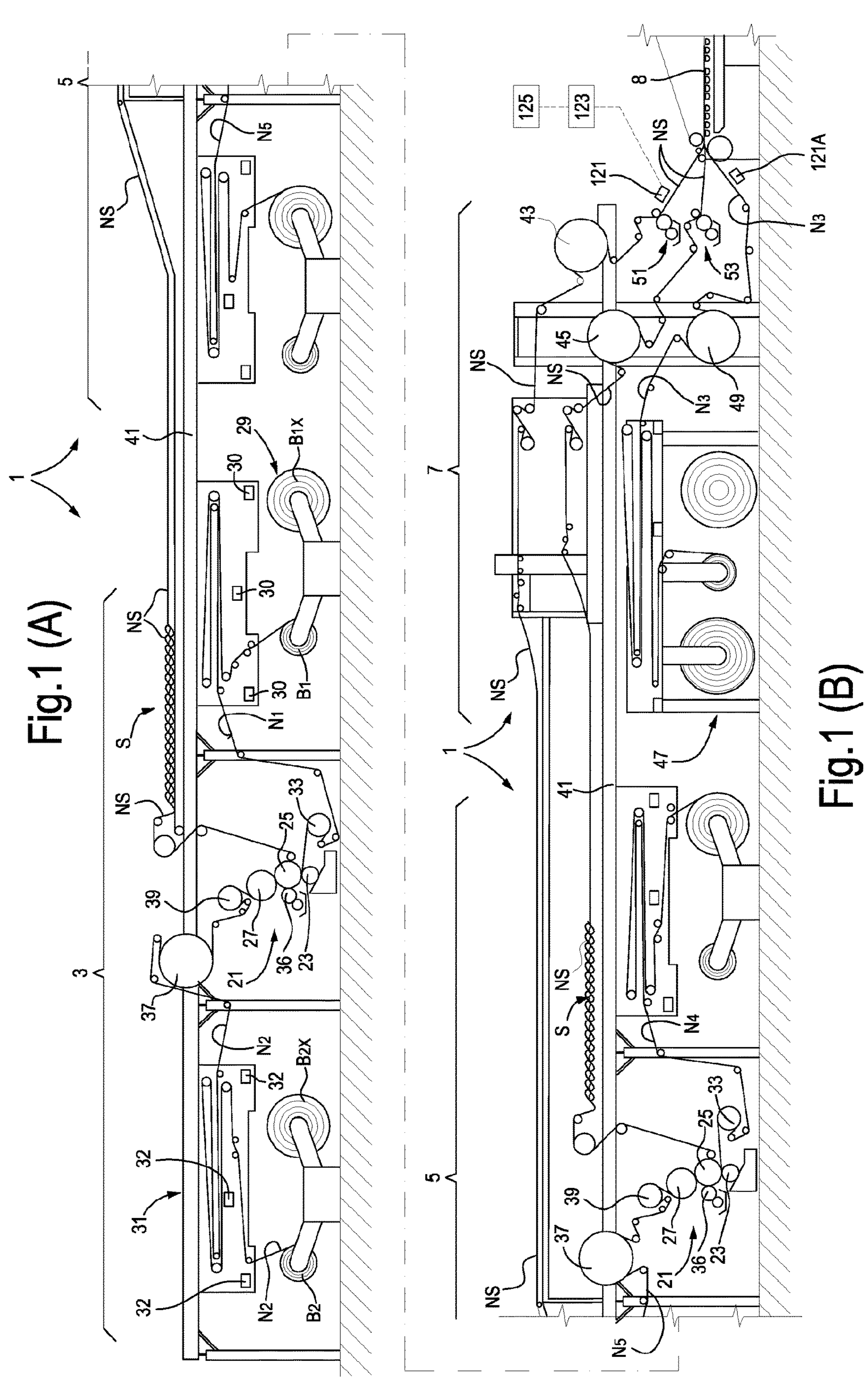
FIGS. 1A-1D show portions of a plant for manufacturing corrugated board, arranged in sequence along the board feeding path.
Figure 1:
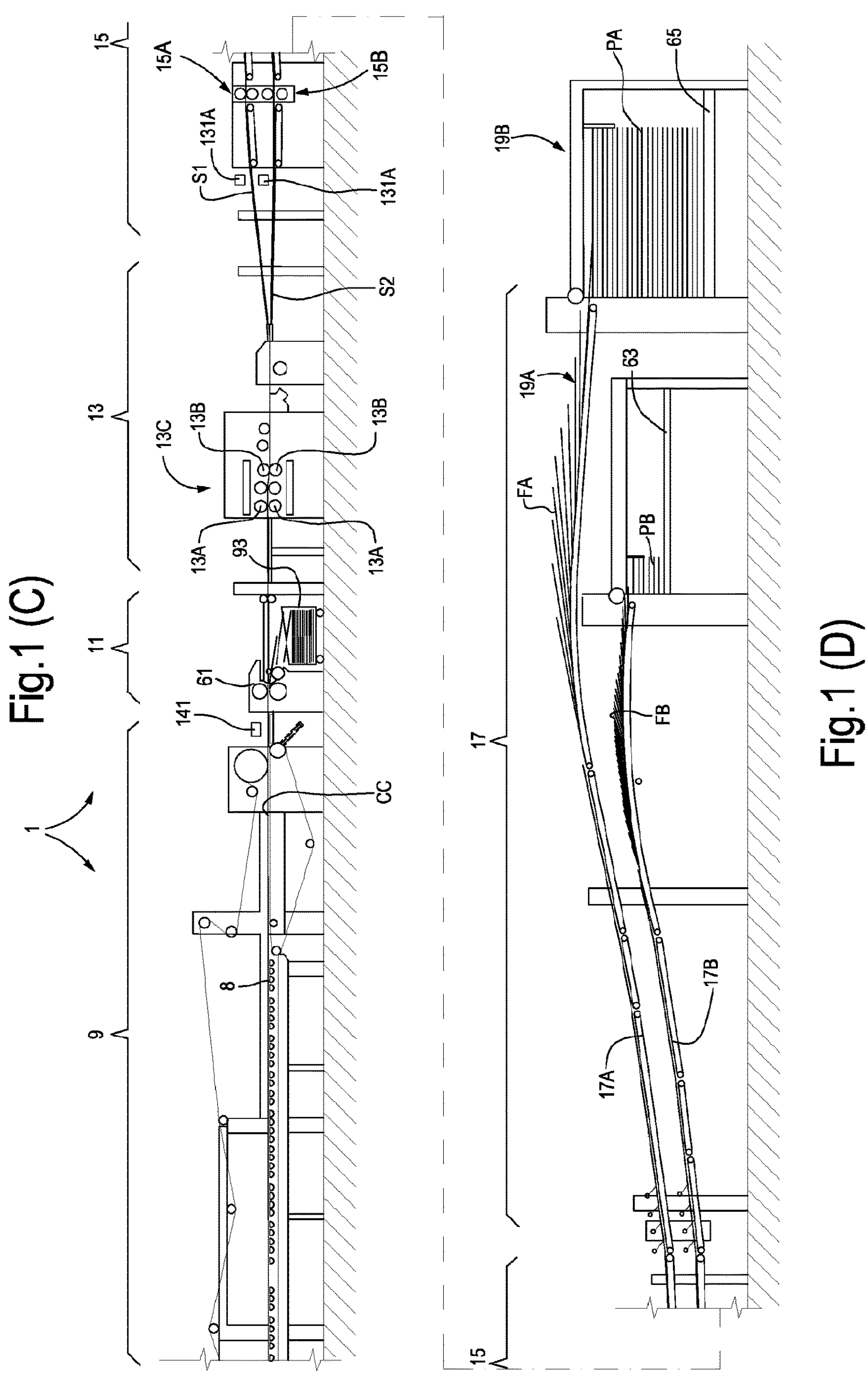

In the attached drawing, number 1 indicates as a whole a plant for manufacturing suitably scored sheets of corrugated board from continuous webs of flat paper.

In the illustrated embodiment, the plant provides for the production of sheets of double wall corrugated board, i.e. with two sheets of fluted paper interposed between two sheets of flat paper, so-called liners, and an intermediate sheet interposed between the two fluted paper sheets. Moreover, the plant is configured to form two piles of sheets on two adjacent stackers.

The general structure of the plant is similar to that disclosed in WO 2017/36685 or WO 2021005123A1. However, the various sections and machines forming the plant can be arranged in a manner even substantially different from that illustrated in the disclosed embodiment. For example, the plant can have the structure disclosed in EP 3678859 or in DE 102010008906.

However, it should be understood that the features described below, related to the sheet processing system for detecting the order change, can be used in equivalent manner in plants provided with a different number of corrugators, and thus adapted to produce a corrugated board sheet comprising a different number of sheets of fluted paper and sheets of flat paper. For instance, the corrugated board can be single wall corrugated board, i.e. formed by a web of fluted paper joined to two outer webs of flat paper. Also the stacking systems can be different, for example they can be adapted to form only a single pile or more than two piles of board sheets. Analogously, the double facer and the longitudinal cutting and scoring stations, described hereunder, can be configured differently from what described and illustrated herein.

With reference to the illustrated embodiment, the plant 1 comprises a first section 3, for the production of a first web NS of single-face corrugated board, a second section 5 for the production of a second web NS of single-face corrugated board, a third section 7 for feeding the two webs of single-face corrugated board and a web of flat paper to a double facer 8, a section 9 comprising the double facer 8 and the corresponding accessories. From section 9 a double wall corrugated board CC exits, formed by the set of the webs NS of single-face corrugated board and the web of flat paper glued thereto, the flat paper web forming a second liner of the corrugated board web.

A converting system is provided downstream of section 9 to convert the corrugated board web CC into single sheets of one or more distinct production orders or batches. In general, the converting system comprises longitudinal and transverse cutting systems as well as longitudinal scoring systems for cutting the corrugated board web CC into strips, scoring the strips and cutting the various strips into separate sheets. The converting system further comprises order change devices, as detailed below.

In the illustrated embodiment, the converting system comprises the following members. Downstream of the double facer 8, a section 11 is provided, wherein devices are arranged for removing trimmings and changing orders, and downstream of section 11, a section 13 is provided for longitudinally cutting and scoring the corrugated board CC coming from the section 9 containing the double facer 8, in order to divide the corrugated board sheet into a plurality of longitudinal strips of corrugated board.

Moreover, the plant 1 comprises a section 15 for transversely cutting the corrugated board strips coming from section 13, a double conveyor 17 and, lastly, two areas 19A and 19B for stacking the board sheets cut in section 15 and fed by means of the double conveyor 17.

In section 3, a first corrugator 21 is arranged. Corrugators usable for producing a web of single-face corrugated board are known in se. Only the main elements of the corrugator will be described hereunder, the corrugator being for example as that described in U.S. Pat. No. 8,714,223 or in EP 1362691, whose content is included in the present description.

Briefly, the corrugator 21 comprises a first corrugating roller 23 co-acting with a second corrugating roller 25 and a pressure roller 27, or other pressure member, to couple a web of flat paper and a web of fluted paper together, as described hereunder. More in particular, a first web N1 of flat paper is fed to the corrugator 21 from a first unwinder 29. The unwinder 29 may be realized in known fashion, thus it will not be described in detail. The unwinder 29 may comprise two or more positions for a first unwinding reel B1, from which the first flat paper web N1 is supplied, and a second waiting reel B1X, which will be unwound when the reel B1 is finished.

A second web N2 of flat paper is unwound from a second unwinder 31, which can be substantially equal to the unwinder 29, and onto which a first reel B2, from which the flat paper web N2 is unwound, and a second waiting reel B2X are arranged, the waiting reel B2X starting to be unwound when the reel B2 is finished.

The first flat paper web N1 is fed to the corrugating roller 23, after having been passed around a heating roller 33. The winding arc of the flat paper web N1 around the heating roller 33 can be modified in order to transfer to the flat paper web N1 a greater or lower amount of heat coming from inside the heating roller 33 or a heating plate, for example heated with vapor circulating inside itself.

The first flat paper web N1 is fluted passing through the nip formed between the corrugating rollers 23 and 25. A suitable glue is applied to the tops or crests formed on the fluted paper web by means of an application roller 36 of a gluing unit, so that the fluted paper web N1 can be glued onto the flat paper web N2 fed, together with the fluted paper web N1, through the nip formed between the second corrugating roller 25 and the pressure roller 27.

The application roller is in contact with the crests of the fluted paper web N1 driven around the second corrugating roller 25. The application roller 36 receives the glue from a tank or the like.

In some embodiments, the second flat paper web N2 is fed around one or more heating rollers 37, 39 arranged between the unwinder 31 and the corrugator 21, in order to be heated. The contact arc between the flat paper web N2 and any one or both of the rollers 37, 39 can be modified in order to vary the amount of heat transferred by the roller(s) 37, 39 to the flat paper web N2 before it comes into contact with the pressure roller 27. Also the pressure roller can be heated internally to glue the paper webs N1 and N2 in conditions of high pressure and high temperature.

Instead of, or in combination with, heating rollers, heating plates can be provided.

Figure 2:
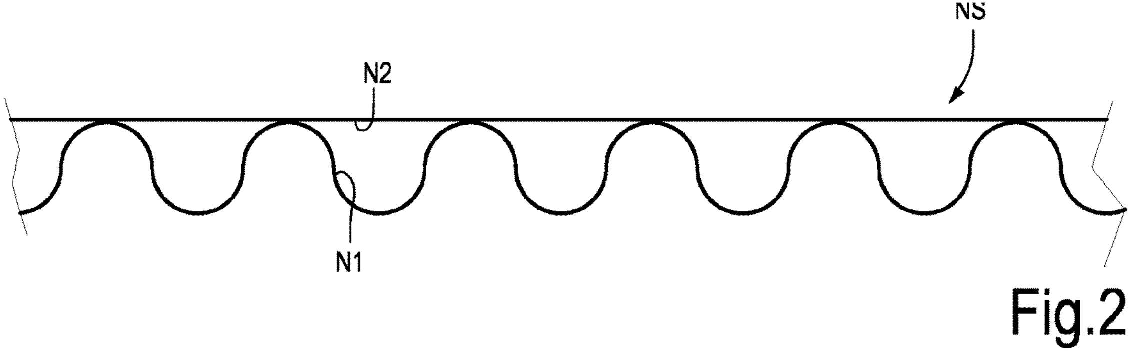
FIG. 2 shows an enlarged schematic section of a portion of single-face corrugated board web exiting one of the corrugators.
Figure 3:
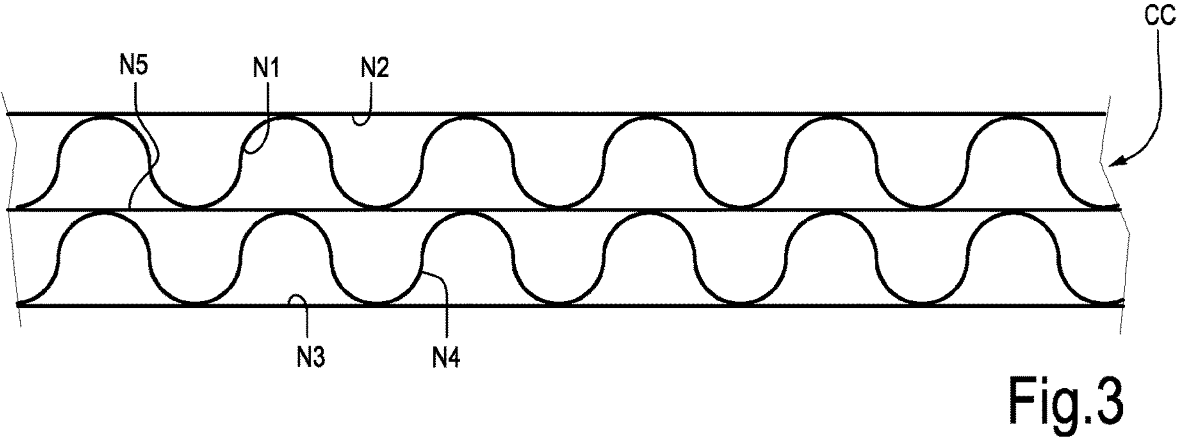
FIG. 3 shows an enlarged schematic section of a portion of corrugated board exiting the double facer.

At the output of the corrugator 21, a single-face corrugated board web NS is obtained, formed by the first fluted paper web N1 and the second flat paper web N2, as shown in the enlargement of FIG. 2. The waves or flutes O formed on the first fluted paper web N1 are glued by means of a glue C, applied by the gluing unit to the flutes O of the fluted paper web N1, onto the surface of the flat paper web N2 facing the fluted paper web N1.

Both the first unwinder 29 and the second unwinder 31 comprise a splicer, indicated respectively with 30 and 32. The splicer is typically comprised of more components, schematically shown in the figure, that can take variable mutual positions based on which reel is being processed and which is waiting. Examples of splicers are disclosed in U.S. Pat. Nos. 7,441,579; 6,966,961; EP 3231751.

Downstream of the corrugator 21 a bridge 41 is provided, which extends towards the section 5 and the following sections 7 and 9 of the plant 1. On the bridge 41 a stock S of single-face corrugated board web NS can be formed, with the formation of suitable accumulation folds, so that the operating speed of the corrugator 21 can be made, at least partially, independent of the operating speed of the downstream sections.

The web of single-face corrugated board NS is then fed along a first path which develops above the bridge 41 up to a heating roller 43 or other heating system, around which the single-face corrugated board NS can be wound for an adjustable arc, to be appropriately heated before reaching the double stacker 8 of section 9.

In the illustrated embodiment, the plant 1 comprises a second section 5 substantially equal to the section 3, where a second single-face corrugated board web, still indicated with NS, is formed, by means of a further pair of paper webs N4, N5 coming from unwinders analogous to the unwinders 29 and 31, and a corrugator analogous to the corrugator 21. This second single-face corrugated board web NS is fed to the bridge 41 to form a stock S and be fed towards the double stacker 8 of the section 9, being wound around a heating roller 45 or other heating member, substantially equivalent to the heating roller 43.

In other embodiments, the section 5 can be omitted, as well as the respective corrugator. Vice versa, in further embodiments, more than two sections 3, 5 may be provided, with respective corrugator and unwinder for corrugating and unwinding the paper web to form respective single-face corrugated board webs NS, which are then glued together by means of the double stacker 8 of section 9.

A flat paper web N3 is unwound from a further unwinder 47 and fed, preferably passing around a heating roller 49 or other heating member, to the section 9 of the double stacker 8. Gluing units 51, 53 apply, in a known manner, a glue to the flutes of the respective single-face corrugated board web NS, to glue them together and to the flat paper web N3, which will form the second outer liner of the corrugated board CC coming out from section 9, the first outer liner being formed by the flat paper web N2.

The section 9 containing the double stacker 8 can be realized in a known manner and will not be described in detail herein. Examples of embodiment of the double stacker 8 are illustrated in U.S. Pat. No. 7,291,243 and in US 2012/0193026, whose content is included in the present description and which can be referred to for greater details of embodiment of this section of the plant.

In section 11 a rotating cut-off knife or other cut-off member 61 is provided, which can perform transverse cuts to sever completely or only partially the corrugated board CC fed from section 9. The cut-off knife 61 can be realized, for example, as described in U.S. Pat. No. 6,722,243, whose content is included in the present description and which can be referred to for greater details of embodiment of this section of the plant. Instead of a rotating cut-off knife, other generic transverse cutting members can be used, for example water nozzles, laser systems, cutters or other devices adapted to per a cut extending in a direction transverse (not mandatory orthogonal) to the feed direction of the corrugated board web CC.

The rotating cut-off knife 61 can be especially used to discharge portions of corrugated board CC where gluing defects or other defects are detected through vision systems or other known system, described for example in WO 2017/036685, as well as to co-act in the format change sequence. In particular, the cut-off knife is adapted to make intermediate transverse cuts in the corrugated board, so as to connect with one another longitudinal strips of consecutive orders in the transition area.

In the illustrated embodiment, the corrugated board CC, fed through the cutting and scoring section 13, is divided into strips which can be deviated along two paths defined by the two conveyors 17A, 17B of section 17, at different heights. Section 13 can be realized in a known manner, for example as described in U.S. Pat. Nos. 5,951,454, 6,165,117, 6,092,452, 6,684,749, 8,342,068 or in other prior art documents mentioned in the above mentioned patent documents, whose content is included in the present description. In general, the cutting and scoring section can comprise one or more slitter scorer 13C, that, in addition to longitudinally cut the corrugated board web CC into longitudinal strips, can generate side trimmings and form scoring lines.

To this end, the slitter scorer 13C can comprise one or more series of longitudinal scoring tools 13A and one or more series of longitudinal cutting tools 13B. Each series of longitudinal scoring tools can comprise a plurality of longitudinal scoring tools adapted to be arranged in adequate positions along a transverse direction relative to the feed direction of the corrugated board CC through the plant 1. Analogously, each series of longitudinal cutting tools can comprise a plurality of longitudinal cutting tools adapted to be arranged in adequate positions along a transverse direction relative to the feed direction of the corrugated board CC through the plant 1.

The position and number of the longitudinal cutting tools 13B and the longitudinal scoring tools 13A can vary from one to the other of more production orders or batches, according to the width of the single corrugated board strips from which the corrugated board sheets are obtained, and according to the position of the longitudinal scoring lines on each sheet.

In the illustrated embodiment, a single slitter scorer 13C is shown, but the plant 1 can also comprise greater number of slitter scorers. Alternatively, it is possible to use a number of scorers different than the number of slitters. In general, the plant 1 can comprise a number n1 of series of longitudinal scoring tools and a number n2 of series of longitudinal cutting tools where n1 is equal to n2, or n1 is different than n2. The mutual position of the longitudinal cutting and scoring tools can be variable and different than that illustrated.

Positioning devices can be associated with the slitter(s) scorer(s) for positioning the longitudinal scoring tools and the longitudinal cutting tools, based on the specific requirements of each order.

The two conveyors 17A, 17B transport corrugated board sheets obtained by transversely cutting the continuous strips in section 15, in order to form piles PA, PB on collection planes 63, 65, known and realized for example as described in EP 1710183, U.S. Pat. No. 5,829,951, or in other patent documents mentioned therein, whose content is included in the present description.

In the illustrated embodiment, section 15 comprises two cut-off knife 15A and 15B, configured to divide longitudinal strips S1, S2 into single sheets FA, FB. A variable number of strips can be fed to each cut-off knife 15A, 15B, based on the overall number of strips into which the corrugated board web CC has been divided by the slitter scorer 13C and the ways they are distributed toward the two conveyors 17A, 17B. In some embodiments, only a cut-off knife is provided and a single path for the cut sheets. More than two cut-off knives can be provided, with respective paths for feeding and stacking the cut sheets.

Recently, it is an increasingly common practice to print at least one of the two liners, i.e. of the two outer flat paper webs N2, N3 of the corrugated board web CC. The printed surface of the liner(s) is that facing the outside of the corrugated board CC. Printing can be carried out in-line or not. In case of in-line printing, the plant 1 for producing the corrugated board sheets FA, FB comprises a printer along the feeding path of at least one of the flat paper webs N2, N3, to print the face of the web destined to remain on the outside of the corrugated board CC. The printer is usually provided upstream of the respective single facer or, if the printed web is the flat paper web N3, upstream of the double facer 8. The printer (not shown) can be a digital printer, particularly useful to print a limited number of images for even very small production batches or orders.

In other embodiments, printing can be performed outside the production line, so that the flat paper web intended to form the printed liner is provided with the images, required for the production of the single batches or orders, before being wound in a reel. In this case again, it is advantageous to use a digital printer to achieve optimal flexibility and to allow to print smoothly small amount of images related to production batches or orders comprised of few sheets.

In general, each production order or batch will be characterized by an own printed image. The printed image characterizing a given order is usually different than the printed image characterizing a different order.

On each sheet FA or FB of each order, one or more printed images can be provided on one of the two liners. It is also possible that both liners are provided with printed images.

As mentioned, in the present context the term "printed image" refer to a decorative and/or informative printed image, adapted to give information and readable on the outside of a package realized by the user with the corrugated board sheet. A decorative printed image can comprise (or be constituted by) an informative image; an image can even be a combination of a decorative image and an informative image, adapted in general to remain clearly visible on at least one face of the corrugated board sheet even after the sheet has been folded to form a box, for instance, and intended for the final user and/or the operator.

Typically, a decorative image and/or an informative image as understood herein may comprise, individually or in combination, one or more of the following elements: a mark; a logo; a decorative pattern; a piece of information, for instance on the content of the box made with the corrugated board sheet, adequately folded. In general, the image is an element characterizing the sheet or the item produced with the sheet (for instance a box) when used after having been produced. The term as used herein does not comprise any printed elements intended only to control the feed of the web material along the plant 1 for producing corrugated board sheets FA, FB, for example transverse or longitudinal reference markers simply used for checking or phasing the cuts.

As mentioned, from a same series of paper webs it is possible to manufacture more production orders or batches, different from one another, of sheets FA, FB. Each order comprises a given number of sheets. The sheets of each order are usually different than the sheets of another order. They can differ in one or more of the following distinctive elements: the longitudinal dimension, the transverse dimension, the number and the position of the scoring lines, the image on either or both the outer faces of the sheet, constituted by the outer surfaces of the two liners.

Usually, a single production order or batch comprises a number of sheets occupying only a part of the transverse and longitudinal extension of the paper webs forming the corrugated board web CC. Therefore, several production orders or batches can be manufactured in sequence with the same set of reels of paper webs. When reference is made to a printed surface of one of the two liners N2, N3 of the corrugated board web, this means that several series of images belonging to several production orders are reproduced on the flat paper web in sequence, i.e. along the longitudinal extension of the flat paper web. In general, the images of a given production order are equal to each another; images of different production orders differ from each other.

As mentioned above, due to the fact that the corrugated board web CC can be slit into two or more strips, and each strip can be used to produce one or more orders in sequence, in the flat paper web printed with the images characterizing the individual orders, images can be provided changing both in transversal direction, from one to the other of the individual strips, and in longitudinal direction. Each individual strip can be used to produce orders different than the orders produced with the other strips. Furthermore, each strip can be used for producing different orders in sequence.

Figure 4:
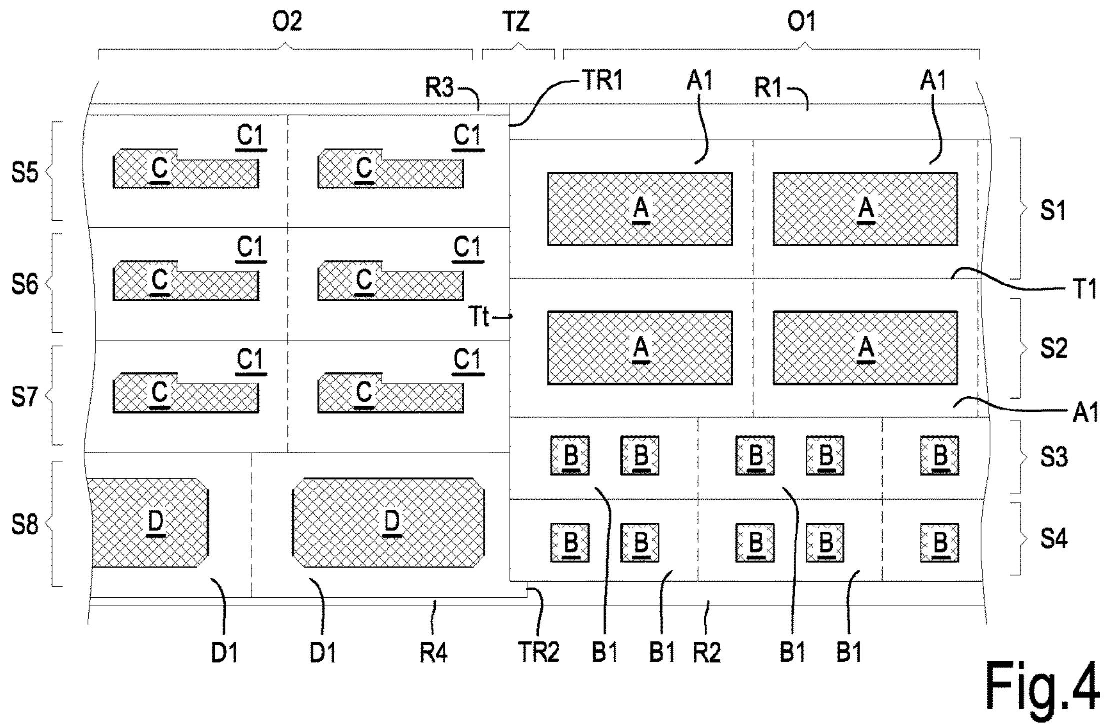
FIG. 4 is a plan view of a portion of corrugated board in an area of transition between a previous order and a subsequent order.

FIG. 4 schematically shows a portion of the corrugated board web CC in the transition area between a first series of orders and a second series of orders. Reference TZ indicates a transition area between a group O1 of production orders or batches and a group O2 of production orders or batches. F indicates the feed direction of the corrugated board web CC. The orders of the group O1 are downstream of the orders of the group O2, i.e. they are produced before the orders of the group O2.

Just by way of non-limiting example, in the portion of corrugated board web CC converted to form the orders O1, the corrugated board web CC is longitudinally cut into four longitudinal strips S1, S2, S3 and S4. The strips S1, S2 are for example equal to each other, and the strips S3, S4 are equal to each other but differ from the strips S1, S2. The strips S1, S2 are fed toward the cut-off knife 15A and the strips S3, S4 are fed toward the cut-off knife 15B, or vice versa. T1 indicates a longitudinal cutting line separating the strips S1, S2 from the strips S3, S4. R1 and R2 indicate two lateral trimmings.

The strips S1, S2 are divided into sheets by the cut-off knife 15A (or 15B). Each sheet is formed by a portion of longitudinal strip indicated with A and an image A1 is printed on it. Similarly, the strips S3, S4 are divided by the cut-off knife 15B (or vice versa) into sheets, each of which is formed by a portion B of corrugated board and has a double image B.

As the strips S1, S2 differ from the strips S3, S4, in practice in the area O1 two distinct orders (or sub-orders) of sheets A1 and B1, respectively, are produced, which are separately stacked in the two stacking areas 19A, 19B. The two sub-orders A1 and B1 can have a different number of strips.

The fact that the two sub-orders end in the same transition area TZ is useful but not necessary. In some situation, a sub-order (for instance the sub-order formed by the strips S1, S2) ends before the other one.

Upstream of the transition area TZ, the corrugated board CC is divided into four strips S5, S6, S7, S8. The fact that the number of strips of the first order O1 is equal to the number of strips of the second order O2 is given just by way of example. It shall be understood that the number of strips of the order O1 can be different than the number of strips of the order O2.

In the illustrated example, the strips S5, S6, S7 are equal to one another and will be divided into sheets C1, each of which has an image C. The strip S8 will be divided into sheets D1, each of which having an image D. The strips S5, S6, S7 will be delivered to one of the two cut-off knives 15A, 15B, while the strip S8 will be delivered to the other of the two cut-off knives 15A, 15B. In the portion O2 of corrugated board CC two trimmings R3, R4 are provided, that can have width different than that of the trimmings R1, R2, depending upon the transverse dimensions of the strips S1-S8.

In the transition area TZ between the order O1 and the order O2, one or more transverse cuts TR1, TR2 Tt are formed. The two transverse cuts TR1, TR2 join the trimmings R1, R3 and R2, R4 respectively. The transverse cut Tt joins the two longitudinal cuts T1, T2, separating the strips sent to the two different levels of the stackers, i.e. to the two cut-off knives 15A, 15B.

In some embodiments, the trimmings R1, R3 and the trimmings R2, R4 can be joined by a continuous cut, that does not interrupt the trimming and can constantly remain in the corrugated board web, moving transversely from a position to the other in the transition area TZ.

The transverse cuts TR1, TR2, Tt may be made by the cut-off knife 61.

In the illustrated example, the various sheets A1, B1, C1, D1 belonging to different production orders following one another in transverse and longitudinal direction along the corrugated board web CC differ from one another in the transverse and longitudinal dimensions, and are characterized by an image (or several images as in the example of sheets B1) different from an order to the other.

As the transverse and longitudinal dimension of the sheets changes from an order to the other, when the converting system for converting the corrugated board web CC shall pass from the production of a previous order (for example the order of the sheets C1) to the production of a subsequent order (for example the order of the sheets E1), several members of the converting system shall be set for the new production order. Typically, the longitudinal scoring tools 13A and the longitudinal cutting tools 13B shall be positioned in the right manner. Moreover, the cut of the cut-off knives 15A, 15B shall be set, as well as the knife 61 to perform the transverse cuts TR1, TR2 and Tt.

In particular, the setting of the longitudinal scoring tools 13A and the longitudinal cutting tools 13B allows to position in the right manner the longitudinal cutting lines defining the strips S1, S2, S3, S4, S5, S6, S7 and S8, as well as the scoring lines (not shown). Also the cut-off knives 15A, 15B shall be suitably set to adapt them to the longitudinal length of the sheets of the new order, and the stackers.

To make the passage from the setting for the production of a previous order O1 to the setting for the production of a subsequent order O2, passing through the transition area TZ, smoother and safer, the plant 1 has a control system and a visual inspection unit, configured and co-acting as described below.

In general, a single visual inspection unit can be provided with a single video camera or other visual inspection member, or a plurality of visual inspection members. Several visual inspection units can be also provided, arranged in various points of the plant 1.

In the example illustrated in the attached drawing, in FIG. 1(C) a visual inspection unit 121 is schematically shown, arranged upstream of the double facer 8. In the illustrated embodiment, the visual inspection unit 121 is arranged to visually check the upper liner N2 of the corrugated board web CC. In addition to, or instead of, the visual inspection unit 121, a visual inspection unit 121A can be arranged on the lower side of the corrugated board web CC to check the lower liner N3. The position and number of the visual inspection units depend on which of the two liners N2, N3 is provided with the printed images A, B, C, D. Moreover, each visual inspection unit 121, 121A may comprise a single visual inspection member, for example a single video camera, or a plurality of visual inspection members, for example a plurality of cameras staggered in the transverse direction, to visually check the entire width of the corrugated board web CC.

In the illustrated embodiment, the visual inspection unit 121 is provided upstream of the double facer 8. This position is currently preferred, as it is farther from the members that shall be controlled and set when the order changes. As the converting members for converting the corrugated board CC are set when a change is detected in the image of the liner visually checked by the visual inspection unit, the more it is distant (upstream) from the members to be set, the longer is the time available to perform the movements and the operations necessary to configure the plant for passing from the production of a current order to the production of a subsequent order. However, the described arrangement is not mandatory. For example, in some embodiments, the visual inspection unit 121 is provided along the section 9, above the double facer 8. Less advantageously, the visual inspection unit 121 can be provided downstream of the double facer 8.

It is useful that the visual inspection unit is in a position to visually check the corrugated board web CC, or the liner thereof, in a position from where it is possible to track the acquired image along the path of the corrugated board web towards the subsequent downstream stations 11, 13, 15, where the rotating cut-off knife 61, the longitudinal cutting and scoring tools and the cut-off knives 15A, 15B are provided, for the reasons that will be more apparent from the description below.

In fact, according to what disclosed herein, the visual inspection unit is adapted to detect the passage of the images printed on the liner and to recognize the transition from an image of a previous production order to the image of a subsequent production order. The passage from an image to the other is detected as the end of the current production order (previous production order) and the start of the subsequent production order.

By detecting this transition upstream of the converting members (longitudinal and transverse cutting, scoring) it is possible, as described below, to set the converting members for processing the subsequent order.

To this end, the visual inspection unit 121 can interface with a control system 123. The control system 123 comprises a memory 125, or interfaces with a memory 125, where data are stored useful for setting the plant, i.e. for setting the converting system in the right manner to produce a subsequent order when, through the visual inspection unit 121, the transition is detected from an image characterizing a previous order to the image characterizing a subsequent order, for example the passage from the images A, B to the images C, D.

Figure 5:
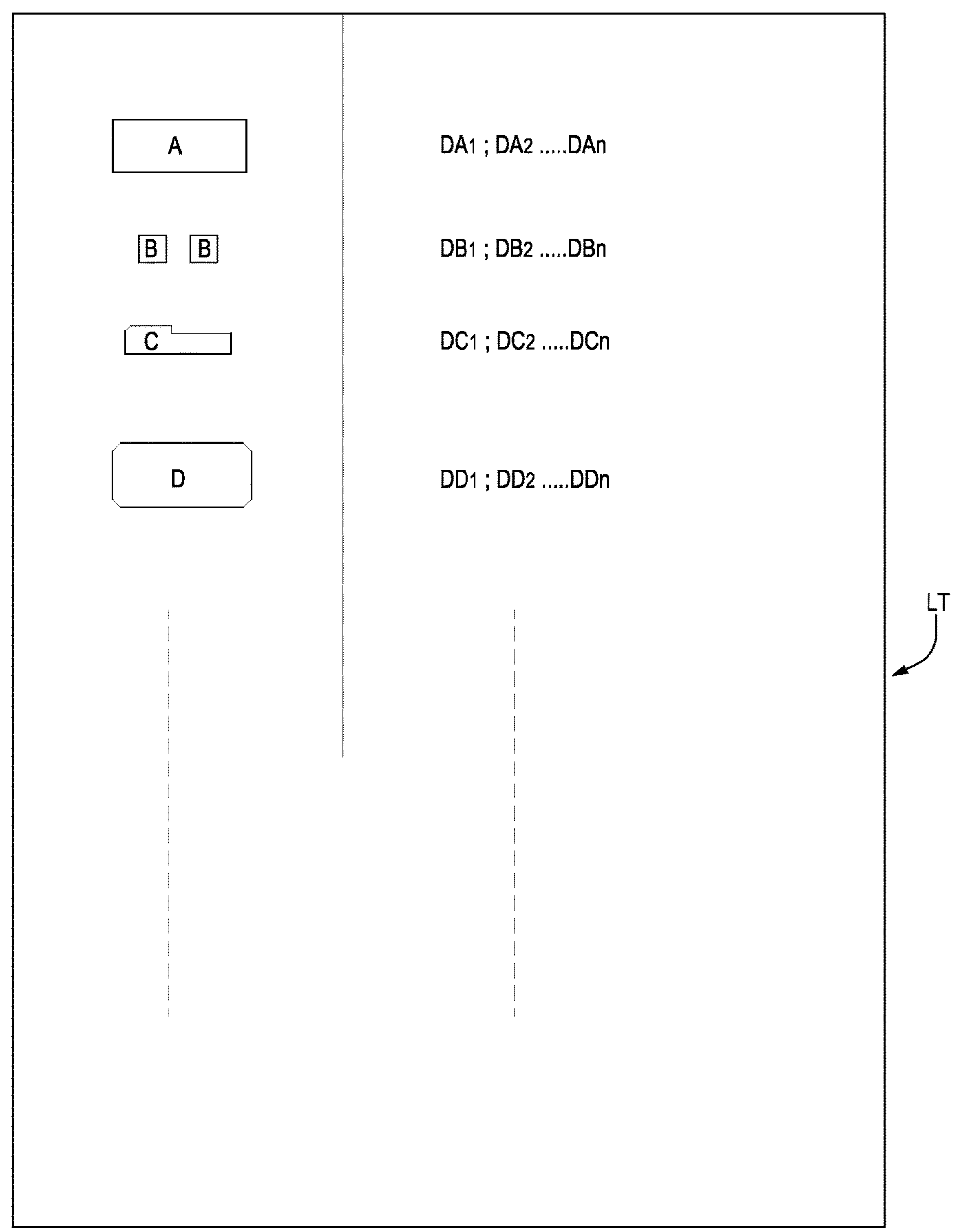
FIG. 5 schematically shows a lookup table.

A database in the form of a lookup table can be stored in the memory 125. The lookup table is schematically shown in FIG. 5 and indicated with LT. The term "lookup table" refers to a memory where a series of data corresponds to each image A, B, C, D associated with a production order or batch, useful for setting the various stations of the converting system. The data are schematically indicated in the right column of the lookup table shown in FIG. 5, wherein in the left column the images A, B, C, D are schematically shown. For example, the data DA1, DA2 . . . DAn are associated to the image A, useful for setting the various members for producing the batch or order with which the image A is associated. The data can indicate, for example: the number of longitudinal scoring tools and the position thereof, the number of longitudinal cutting tools and the position thereof, the length of the transverse cut made by the cut-off knife 15A or 15B, or other data necessary or useful to produce the order A. Similar indications are used for the other production batches or orders. Data can also contain information on the length and the position of the transverse cuts Tt, TR1, TR2 that the rotary cut-off knife 61, or other cut-off device, shall perform in the transition area TZ.

Thanks to the fact that the visual inspection unit 121 detects the passage from the first image of each order upstream of the converting system, and preferably upstream of the double facer 8, through the control system 123, and based on the data obtained from the lookup table LT, it is possible to set the members of the various stations of the converting system before the portion of corrugated board web CC intended to be converted into the sheets of the respective order arrive in these stations.

For example, when the visual inspection unit 121 detects the passage of the first image D of the order following the one in progress, the control system 123 detects the passage of the image C and of the image D and consequently recovers from the lookup table the data CC1, . . . . CCn and the data DD1 . . . DDn related to the orders of the sheets C1 and D1 that shall be formed from the portion O2 of corrugated board web. With the recovered data, the control system 123, or other control unit interfaced therewith, sets the members downstream of the visual inspection unit 121 to shift from the production of the sheets A1, B1 to the production of the sheets C1, D1. In particular, the recovered data allow positioning in the right way the longitudinal scoring tools 13A and the longitudinal cutting tools 13B, as well as the cut-off knives 15A or 15B, so that the corrugated board web CC can start to be converted into the sheets of the order characterized by the image C and by the image D as the first image enters the converting system.

As in the transition area TZ transverse cuts Tt, TR1, TR2 shall be performed by the rotating cut-off knife 61, or other cut-off member, the data recovered from the lookup table also contain information necessary to make the transverse cuts in the right position and of the right length.

A tracking system can track the first image C and the first image D until they arrive for example in the slitter scorer of section 13. The tracking system can comprise a rotary encoder associated with a roller or a roller system, whose peripheral speed is equal to the feeding speed of the corrugated board web CC. In combination with, or instead of, the rotary encoder, in further embodiments the tracking system comprises an optical system or a laser system to detect accurately the speed at which it slides without touching the corrugated board CC.

By knowing the distance between the visual inspection unit 121 and the first station 13 it is possible to start processing the new order as the first image C, D associated with the new order has run the distance between the point of detection by the visual inspection unit and the station 13. Moreover, when the end area of the orders O2 arrives in the station 11, with the setting performed by the control system 123 (or other control unit), the rotating cut-off knife 61 or other cut-off member performs the transverse cuts TR1, TR2, Tt required in the transition area TZ in the right position.

In some embodiments, in the transition area TZ the corrugated board web CC is completely cut, i.e. it is severed forming the end part of the order area O2 and the beginning of the order area O1. In this case again, through the information from the lookup table LT it is possible to control the rotating cut-off knife 61 or other cut-off member, so that the complete transverse cut of the corrugated board web CC is performed in the right position, that is in the transition area TZ.

With this arrangement it is possible to control the plant 1 for manufacturing corrugated board sheets, setting it in right and prompt manner for producing the various orders or batches, directly exploiting the images printed on the corrugated board web, through the visual inspection unit 121, without the need for printing or applying in any other manner, on the corrugated board web CC, data or markers specifically intended to this end. It is sufficient that the control system 123 and/or the visual inspection unit 121 are provided with suitable image recognition software, to allow recognizing which image A, B, C, D, E is passing in front of the visual inspection unit and, based on this recognition, to recover from the lookup table LT the right data for setting the production line and, more precisely, the converting system, i.e. the stations converting the corrugated board web CC into single sheets of the various production orders or batches.

The concept described above can be furthered expanded to ensure synchronization of the transverse cuts and the longitudinal cuts with respect to the images A, B, C, D.

According to the prior art, to synchronize the transverse cuts made by the cut-off knives 15A, 15B with the images printed on the corrugated board CC, reference markers shall be provided in positions synchronized with the positions where the transverse cuts shall be made by the cut-off knives 15A, 15B. A detection system, for example a photo cell, reads the passage of the single markers and sends a command to the respective cut-off knife 15A or 15B.

The plant and the method disclosed herein can use the same technique to keep the synchronization between the cuts made by the cut-off knives 15A, 15B and the images A, B, C, D. However, in other embodiments, the visual inspection unit 121, or one or more visual inspection units 131A, 131B, suitably arranged relative to the cut-off knives 15A, 15B, can be used for synchronizing the position of the printed images and the position of the transverse cuts dividing each strip S1-S8 into the respective corrugated board sheets.

In the schematic of the attached drawing, two visual inspection units 131A, 131B are provided, close to the cut-off knives 15A, 15B and upstream thereof. The visual inspection units 131A, 131B detect the images A, B, C, D passing in front of the visual inspection units and, through the control system 123 or other control unit, can send a signal to the cut-off knives 15A, 15B for the synchronization with the images A, B, C, D.

In this way it is not necessary to provide the reference markers that are usually used to synchronize the transverse cut.

In other embodiments, the visual inspection units 131A, 131B are provided downstream of the cut-off knives 15A, 15B and verify the correct positioning of the cutting lines with respect to the images A, B, C, D. In case of displacement between the image and the transverse cutting line, a feedback signal can be generated, adjusting the displacement by advancing or delaying the transverse cut.

According to a further aspect, it is known that the position of the corrugated board CC in transverse direction can vary due to lateral shifting. Typically, to avoid that shifting adversely affects the quality of the finished product, the slitter scorer 13C is provided with a transverse movement following the movement of lateral shifting of the corrugated board CC. In this way, the longitudinal cutting lines and the scoring lines always remain in the right position relative to the edges of the corrugated board and the printed images A, B, C, D.

Usually, the slitter scorer tracks the lateral shifting movements of the corrugated board CC through a longitudinal reference line printed on the corrugated board CC, typically for example along the longitudinal edges, in the area forming the trimming R1 or R2 that shall be removed.

According to an aspect of the method and the plant disclosed herein, in addition to, or instead of, using a longitudinal reference line, the slitter scorer can track the lateral shifting of the corrugated board CC by using the printed images A, B, C, D of the sheets of the various production orders, detected by the visual inspection unit 121 or a further visual inspection unit 141 intended for this purpose and preferably arranged close to the slitter scorer and upstream thereof, at a distance sufficient to send a signal controlling the transverse translation of the slitter scorer when a shifting of the images A, B, C, D, or of at least one of them, is detected. The position of the visual inspection unit 141 indicated in FIG. 1(C), as well as the position of the visual inspection units 131A, 131B, is shown just by way of example and can be also different, based on the features of the plant.

Essentially, the visual inspection unit 141 is adapted to detect the images A, B, C, D (or at least one of them) and to verify whether the sequential images of a given production order move transversely, i.e. orthogonally to the feed direction of the corrugated board CC due to the lateral shifting of the same corrugated board. Based on the lateral shifting, the control system 123 or other control unit destined to this end, emits a control for laterally translating the slitter scorer 13C.

For synchronizing both the position of the transverse cuts of the cut-off knives 15A, 15B, and the transverse position of the longitudinal cutting and scoring lines described above, it is useful to provide a tracking system, based for example on a rotary encoder associated with a roller rotating at the peripheral speed equal to the speed of the corrugated board, or based on a system with or without contact (optical system, laser system) for detecting the speed of the corrugated board CC, so that, once the visual unit 121, 131A, 131B, 141 has detected the (transverse or longitudinal) position of the image, this position is tracked until the image passes in the slitter scorer and/or in the cut-off knives 15A, 15B. In this way, the data given from the visual inspection unit are synchronized with the actuation of the cut-off knives 15A, 15B i.e. with the actuation of the transverse movement of the slitter scorer 13C.

What described above refers to the control of the so-called dry-end of the plant, i.e. the part of the plant downstream of the double facer 8. It is also possible to use similar criteria for controlling the splicers of one or more of the unwinders of the plant and especially of the unwinders on which the printed paper reels are arranged, intended to form the upper liner and/or the lower liner of the corrugated board CC.

In fact, in some embodiments, it could be necessary to splice together an expiring reel and a reel standing-by. The two subsequent reels can identify an order change area. In other words, the expiring reel contains images of a previous order, while the reel standing-by contains the images of a subsequent order. In this case, the visual inspection unit 121 can be provided in a further upstream position than that shown in the attached figures, for instance upstream of the splicer.

In the above description and in the attached drawing, reference has been made to a plant for manufacturing corrugated board with one or more sheets of fluted paper and two outer sheets of flat paper (liners). However, in some cases the corrugated board sheets FA, FB comprise only one liner, on a face, while the opposite face is formed by a fluted sheet. In this case, it is possible to omit the double facer 8.

Moreover, in some embodiments, only longitudinal cutting tools can be provided, and not longitudinal scoring tools, for example if the sheets produced by the plant 1 have no scoring lines.

Innovative features described above with reference to a plant for manufacturing cut and scored sheets with double liner can be also used in plant producing single-face board sheets, i.e. with only one liner, and/or board sheets without scoring lines. In these cases, the instruction contained in the lookup table for positioning the longitudinal scoring tools are not provided.

It is understood that the drawing only shows an example provided by way of a practical arrangement of the invention, which can vary in forms and arrangements without however departing from the scope of the concept underlying the invention. Any reference numbers in the appended claims are provided for the sole purpose of facilitating reading of claims with reference to the description and the drawing, and do not in any manner limit the scope of protection represented by the claims.

The invention claimed is:

1. A plant for producing corrugated board sheets; wherein the plant comprises:

a single facer for producing a corrugated board web comprising a first web of flat paper and a web of fluted paper;

a converting system for converting the corrugated board web into single sheets, each sheet having at least one decorative and/or informative image on at least one face which will remain visible in use of the corrugated board sheets; the corrugated board web containing sheets of a plurality of consecutive orders, the sheets of two consecutive orders of said plurality of consecutive orders differing from each other in the at least one decorative and/or informative image, the at least one decorative and/or informative image of the sheets of a single order being equal to only one another;

a visual inspection system comprising at least one visual inspection unit running an image recognition software and provided upstream of the converting system with respect to a feed direction of the corrugated board web; wherein the visual inspection unit with the image recognition software is adapted to detect and recognize the at least one decorative and/or informative image printed on the corrugated board web when the corrugated board web passes in front of the visual inspection unit; wherein the visual unit with the image recognition software is configured to recognize change from a previous order to a subsequent order based on recognition of a new decorative and/or information image of said at least one decorative and/or informative image of the subsequent order;

a control system adapted to control the converting system;

wherein the control system comprises a lookup table containing, for each order said at least one decorative and/or informative image of the order and, associated with the at least one decorative and/or informative image of the order, information for setting the converting system to produce said order so that the control system sets the converting system for producing a subsequent order before the image associated with the subsequent order arrives in the converting system, when the visual inspection unit with the image recognition software, detects the passage of the at least one decorative and/or informative image associated with the subsequent order, and recognizes the at least one decorative and/or informative image; and wherein the control system is configured to retrieve from the lookup table information for setting the converting system to produce the subsequent order and to set the converting system based on the information retrieved.

2. The plant of claim 1, further comprising a double facer, so configured to receive the single face corrugated board web and a second web of flat paper, and to join the single-face corrugated board web and the second flat paper web together; at least one of the first flat paper web and the second flat paper web having at least one decorative and/or informative image printed thereon and facing outside of the corrugated board web.

3. The plant of claim 1, wherein the converting system comprises longitudinal cutting tools adapted to divide the corrugated board web into corrugated board strips, each strip of said corrugated board strips containing corrugated board sheets of a plurality of consecutive orders; and wherein information for setting the converting system comprises information indicating a position of the longitudinal cutting tools in a direction transverse to the feed direction of the corrugated board web.

4. The plant of claim 3, wherein the visual inspection system is adapted to detect any lateral shifting of the corrugated board web based on the position of the at least one decorative and/or informative image printed on the corrugated board web; and wherein the longitudinal cutting tools are kept aligned with the corrugated board web forcing the longitudinal cutting tools to move transversely according to a lateral shifting detected by the visual inspection system.

5. The plant of claim 1, wherein the converting system comprises at least a slitter scorer adapted to divide the corrugated board web into corrugated board strips, each strip of said corrugated board strips containing corrugated board sheets of a plurality of consecutive orders; wherein the slitter scorer comprises a plurality of longitudinal scoring tools and a plurality of longitudinal cutting tools; and wherein the information for setting the converting system comprises information indicating a position of the longitudinal cutting tools and of the longitudinal scoring tools in a direction transverse to the feed direction of the corrugated board web.

6. The plant of claim 5, wherein the visual inspection system is adapted to detect any lateral shifting of the corrugated board web based on a position of the at least one decorative and/or informative image printed on the corrugated board web; and wherein the slitter scorer is kept aligned with the corrugated board web forcing the slitter scorer to move transversely according to the lateral shifting detected by the visual inspection system.

7. The plant of claim 1, wherein the converting system comprises at least a cut-off knife adapted to cut the corrugated board web, or longitudinal strips obtained by longitudinally cutting the corrugated board web, into single sheets; and wherein the information for setting the converting system comprises information on dimension, in longitudinal direction, of the sheets.

8. The plant of claim 7, wherein the visual inspection system is adapted to generate a signal for synchronizing the cut-off knife with the at least one decorative and/or informative image.

9. The plant of claim 1, further comprising a cut-off member adapted to make transverse cuts in an area of transition between a previous order and a subsequent order; and wherein information for setting the converting system comprises information indicating a position and length of the transverse cuts in the area of transition.

10. The plant of claim 1, wherein the converting system comprises a stacker for putting sheets, cut from the corrugated board web, over one another; and wherein information for setting the converting system comprises information for controlling the stacker.

11. A method for producing corrugated board sheets, comprising steps as follows:

producing a corrugated board web comprising at least a flat paper web and a fluted paper web; wherein the flat paper web has at least one decorative and/or informative image sequentially printed on at least one face which will remain visible in use of the corrugated board sheets; wherein the corrugated board web contains sheets of subsequent orders, each of said subsequent orders having at least one decorative and/or informative image, the at least one decorative and/or informative image of the sheets of a single order being equal to one another;

feeding the corrugated board web along a feed path in front of a visual inspection unit running an image recognition software and adapted to detect the at least one decorative and/or informative image;

feeding the corrugated board web through a converting system downstream of the visual inspection unit, and converting the corrugated board web into single corrugated board sheets;

providing a lookup table; wherein the lookup table contains for each order: the at least one decorative and/or informative image of the order, and for each order and for each of the at least one decorative and/or informative image, information associated to the order and adapted to set up the converting system to produce a respective order; when the visual inspection unit with the image recognition software detects a change in the at least one decorative and/or informative image of a subsequent order with respect to the at least one decorative and/or informative image of a previous order and recognizes a decorative and/or informative image of the at least one decorative and/or informative image of the subsequent order, from the lookup table information associated with the at least one decorative and/or informative image printed on the corrugated board web and setting up the converting system based on the information retrieved to produce the subsequent order before the corrugated board web, containing the at least one decorative and/or informative image associated with the subsequent order, arrives in the converting system.

12. The method of claim 11, wherein the corrugated board web further comprises a further flat paper web, the fluted paper web being interposed between the flat paper web and the further flat paper web.

13. The method of claim 11, wherein the information associated with the at least one decorative and/or informative image printed on the corrugated board web comprises one or more of the following:

information on position of longitudinal cutting lines for dividing the corrugated board web into longitudinal strips;

information on position of longitudinal scoring lines;

information on one or more transverse cuts in an area of transition from a previous order to a subsequent order;

information on transverse cuts for dividing the corrugated board web, or longitudinal strips obtained by longitudinally cutting the corrugated board web, into corrugated board sheets;

information on setting of stackers for stacking corrugated board sheets;

information on transverse cutting lines for joining together the longitudinal cutting lines of a previous order and the longitudinal cutting lines of a subsequent order in an area of transition.

* * * * *